US005267039A

United States Patent [19]

Elberbaum

[11] Patent Number: 5,267,039

[45] Date of Patent: Nov. 30, 1993

[54] METHOD AND APPARATUS FOR PROCESSING, RECORDING AND RETRIEVING A PLURALITY OF CODED VIDEO SIGNALS

[75] Inventor: David Elberbaum, Tokyo, Japan

[73] Assignee: Elbex Video Ltd., Tokyo, Japan

[21] Appl. No.: 815,439

[22] Filed: Dec. 31, 1991

[51] Int. Cl.[5] .................... H04N 7/04; H04N 7/18; H04N 5/268

[52] U.S. Cl. .................... 358/146; 358/108; 358/147

[58] Field of Search .................... 358/181, 108, 150, 149, 358/148, 146, 93, 335, 147

[56] References Cited

U.S. PATENT DOCUMENTS

| | | | |
|---|---|---|---|
| 2,249,532 | 7/1941 | Lewis | 358/150 X |
| 4,198,656 | 4/1980 | Mathisen | 358/108 X |
| 4,603,352 | 7/1986 | Kameta et al. | 358/148 |
| 4,943,864 | 7/1990 | Elberbaum | 358/108 |
| 5,019,905 | 5/1991 | Pshtissky et al. | 358/146 |
| 5,150,212 | 9/1992 | Han | 358/181 X |
| 5,187,571 | 2/1993 | Braun et al. | 358/85 |

*Primary Examiner*—James J. Groody
*Assistant Examiner*—Safet Metjahic
*Attorney, Agent, or Firm*—Helfgott & Karas

[57] ABSTRACT

In a method and apparatus for coding, processing and retrieving a signal, a plurality of transmitters each including a television camera, generate composite video signals each superposed with an allotted identification code through a transmission line. A sequential switch circuit is provided which connects a plurality of the composite video signals for at least one vertical scanning period of the composite video signal in synchronized sequence with the vertical scanning frequency, and outputs the sequencing signals to a video recorder for recording the sequencing composite video signals superposed with the identification code. The played back regeneration signals are fed to a control circuit and to a memory circuit. The control circuit has a code setting circuit and an extraction circuit which extracts the identification code from the composite video signal for selecting any individually recorded signal when the extracted identification code and the set code coincide. The selectively outputted signal is fed to a memory for storing and retrieving the composite video signal for displaying an image on a television monitor on the basis of the retrieved signal.

20 Claims, 5 Drawing Sheets

10
12
EXTERNAL SYNCHRONIZING GENERATOR
22
SYNCHRONIZING PULSE ADDING CIRCUIT
P1
SYNCHRONIZING PULSE SHAPING AND TIMING CIRCUIT
21
P2
SYNCHRONIZING PULSE CLIPPING CIRCUIT
24
14
TELEVISION CAMERA
17
15
16
INDENTIFICATION CODE GENERATOR
15/1
15/2
SWITCHER
S1
20
18
RECIEVER
28
VIDEO RECORDER AND PLAY BACK
S2
58
MEMORY CIRCUIT
52
CONTROL CIRCUIT
80
MONITOR
56
CODE SETTING CIRCUIT

METHOD AND APPARATUS FOR PROCESSING, RECORDING AND RETRIEVING A PLURALITY OF CODED VIDEO SIGNALS

BACKGROUND OF THE INVENTION

1. Field of the Invention

This invention relates to an apparatus for processing of television camera signals used in close circuit television for recording and monitoring system.

2. Description of the Prior Art

In a monitoring television system used, as one of information transmission systems, at least one television monitor and one video cassette recorder are connected through an electronic switch to a plurality of television cameras and a plurality of transmission lines. The electronic switch provides selection of any one of the television cameras or sequential switching for displaying on the television monitor and recording into the video recorder a picture image of one camera after another.

In such an information transmission system, it is preferable to mutually lock the internal synchronizing signals of a plurality of television cameras and the electronic switching time to an external synchronizing signal, in order to prevent the picture image on the monitor from being disturbed during and immediately after the switching operation from one television camera to another.

As one of the devices for synchronizing a plurality of television cameras, there are known apparatus for transmitting vertical synchronizing signal and a horizontal synchronizing signal or composite synchronizing signal used in a television system. Another known apparatus for transmitting a vertical drive signal and a horizontal drive signal, and driving the television camera and its deflection circuits by the transmitted vertical drive signal, and the horizontal drive signal.

In any of the above known devices of the type under discussion, as the transmitted synchronizing signal itself is a train of pulses, which can be easily influenced by noise, the transmission of a synchronizing signal requires the use of a coaxial cable with its high shielding effect, which makes it costly for systems with plurality of television cameras.

Another known apparatus for synchronizing a plurality of television cameras, is an apparatus for transmitting an external synchronizing signal from an external synchronizing generator to the television cameras by injecting the external synchronizing signal into the video signal transmission line and locking an internal synchronizing signal generator of the television camera by means of the transmitted external synchronizing signal. Such an apparatus is disclosed in U.S. Pat. No. 4,603,352 the contents of which are incorporated herein by reference.

Furthermore, in such an information system, the switching rate from one camera to another must be slow in order to allow the supervisor time to observe the image on the monitor during the video recorder playback of the sequencing cameras. Therefore, the number of cameras in such a system is limited to a few only. If large number of cameras are used in such system, long period of time will elapse before all the cameras are recorded or played back in sequence which is laborious and inefficient.

In another known method for recording a plurality of images from plurality of television cameras, is by providing several video recorders to record the plurality of television cameras simultaneously, which is also laborious, and moreover, it is costly.

SUMMARY OF THE INVENTION

It is the object of the present invention to provide a method and an apparatus for sequentially recording a plurality of cameras at a fast rate and to retrieve any of the recorded images by simple command and without the need to repeatedly search the recorded information for any specific image of any specific camera.

A method for coding, processing and retrieving signal according to the present invention comprises the steps of generating plurality of synchronized composite video signals, each incorporating individually allotted identification code signal, and processing the signals sequentially one after another in rotation, and selectively retrieving any of the signals by extracting the identification code from the composite video signals, storing and retrieving at least one vertical scanning period of the composite video signals into and from a memory circuit when the extracted identification code coincides with a selective code and displaying an image of the retrieved composite video signal from the memory circuit.

An apparatus for coding, processing and retrieving a signal and according to the present invention comprises a plurality of transmitting means, for generating composite video signals incorporating an identification code signal allotted to each transmitting means, an external synchronizing generator for generating external synchronization signal for synchronizing the internal synchronizing generators of the transmitting means and the switching means, a switching means for sequentially connecting the transmitting means to the receiving means in rotation one after another at a predetermined rate and time for outputting the composite video signal generated by the transmitting means, and for connecting the recording means playback output to the receiving means for outputting the composite video signal generated by the recording means, a receiving means for receiving the composite video signals transmitted from the said transmitting means, for outputting same to the recording means, or receiving the composite video signal generated by the recording means playback, for outputting same to the memory means, a recording means for recording the composite video signals received by the receiving means, and playing back the recorded composite video signals for outputting same to the receiving means, a selector means for setting a selector code commensurate with a code allotted to each transmitting means, and for outputting the selector code to the control means, a control means for extracting the identification code signal from the played back composite video signal received from the receiving means, for decoding the extracted identification code signal, and for generating a coincidence signal to the memory means, when the extracted identification code received from the receiving means coincide with the selector code, a memory means for storing and retrieving at least one vertical scanning period of the played back composite video signal when the coincidence signal generated by the selector means is received, and a monitor to display the image of the retrieved composite video signal from the memory means.

Each of the transmitting means includes a television camera to which an identification code is allotted, a circuit for generating code signals corresponding to the identification code, and a circuit for generating a composite signal wherein the code signals are injected into the video signal. Such an apparatus is disclosed in U.S. Pat. No. 4,943,864, the content of which, are incorporated herein by reference; therefore, the recording means records in rotation the composite video signals injected with the code signals received from the transmitting means in sequence one after another.

The switching means include a first switch to connect the transmitting means for a selectable, predetermined time in sequence one after another, at a selectable predetermined rate, to the receiving means and to the memory means. It is preferable that the switching rate is commensurate with to the frequency of the vertical scanning of the composite video signal,. and that the predetermined time is at least one vertical scanning period of the composite video signal. The switching means further include a second switch for routing the composite video signal to the memory means for displaying the recorded images on the monitor.

The receiving means includes a circuit for receiving the sequencing composite video signals from the switching means, and outputting same to the recording means, and a circuit to receive the played back composite video signals from the recording means for outputting same to the memory means and to the control means.

The control means include a circuit for receiving the selector code, a circuit for extracting the identification code signal from the received composite video signal, a circuit for decoding the extracted identification code signal and outputting an identification code, based on the decoded extracted code signal, and a controller for comparing the selector code and the identification code, and outputting a coincidence signal when the two codes coincide.

The memory means includes a circuit to input the sequencing composite video signals received from the switching means, for storing at least one vertical scanning period of the composite video signal., and a circuit to retrieve the stored composite video signal, and output the retrieved composite video signal from the memory means to a television monitor.

The external synchronizing generator means includes a circuit for generating synchronizing pulse signals, transmitted to the transmitting means for externally synchronizing the television cameras, it is preferable that the external synchronizing generator will generate synchronizing pulse signals having a level higher than the white level or lower than the black level of the composite video signal generated by the transmitting means, and injecting the synchronizing pulses into the video transmission lines, connecting to the transmission means, and synchronizing the internal synchronizing generators of the transmitting means, on the basis of the injected synchronizing pulses.

According to the present invention, as the transmitting means are synchronized by a pulse signal propagated through the video transmission line, and as the played back signal is identified by the use of identification code incorporated into the composite video signal, and transmitted from the transmitting means by the use of the same video transmission line, the costs for processing and recording a plurality of television cameras is substantially reduced.

Because the transmitting means are synchronized, they can be sequentially recorded at a fast rate, and according to the present invention, a selective retrieving of a recorded composite video signal becomes possible by code selecting, to coincide with the extracted identification code from the played back composite video signal, and by the use of the memory means to store and retrieve the playback composite video signals when the selected code coincide with the extracted code.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
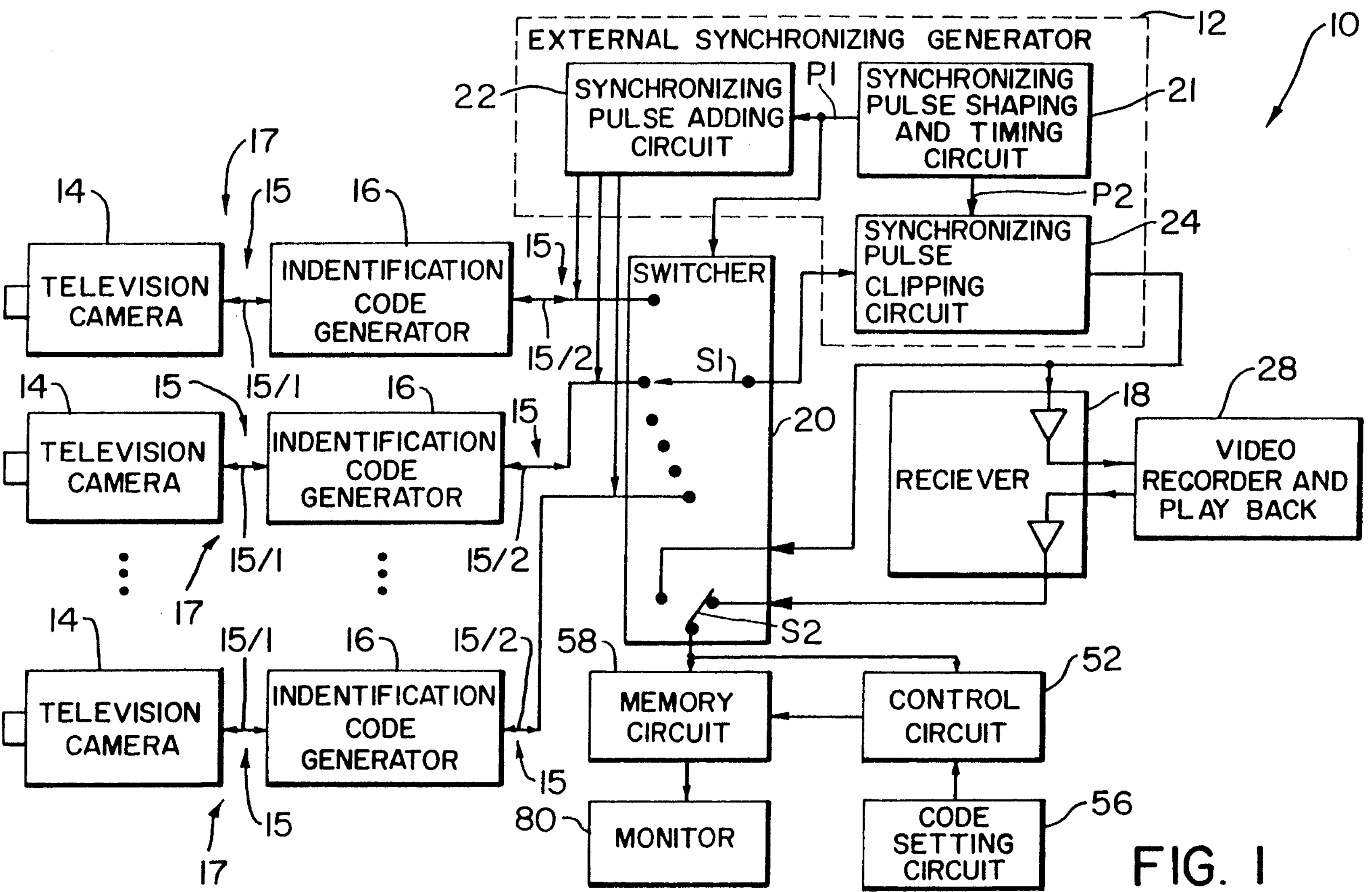
FIG. 1 is a block diagram showing an electric circuit for coding, processing and retrieving a signal apparatus of a preferred embodiment according to the present invention.

Referring to FIG. 1, an apparatus for coding, processing and retrieving signal 10, comprises an external synchronizing signal generator 12, a plurality of transmitters 17, incorporating television cameras 14, synchronized by the external synchronizing signal, and generating a video signal corresponding to the images picked-up by the television cameras, a plurality of identification code generators 16 for generating into each and every composite video signal generated by the television camera 14, a code signal allotted to each and every transmitter 17, a receiver 18 for receiving, amplifying and outputting composite video signals, a switch circuit 20 incorporating a switch S1 for connecting sequentially in rotation the transmitters 17 to the receiver 18 at a predetermined rate and time, and switch S2 for routing the composite video signals to the memory circuit, a synchronizing pulse adding circuit 22 for injecting the external synchronizing signal into the video transmission lines 15 for transmitting the external synchronizing signal to the television cameras 14, a synchronizing pulse clipping circuit 24 for clipping and removing the external synchronizing pulses from the receiver 18 input, a video recorder and playback 28 for recording and playing back the composite video signals generated by the transmitters 17, a control circuit 52 for receiving the sequencing composite video signal and outputting coincidence signal, a code setting circuit 56 for setting a code commensurate with a code allotted to the transmitters 17, a memory circuit 58 for storing and retrieving at least one vertical scanning period of the composite video signal, and a monitor 80 for displaying an image corresponding to retrieved composite video signal.

Figure 2:
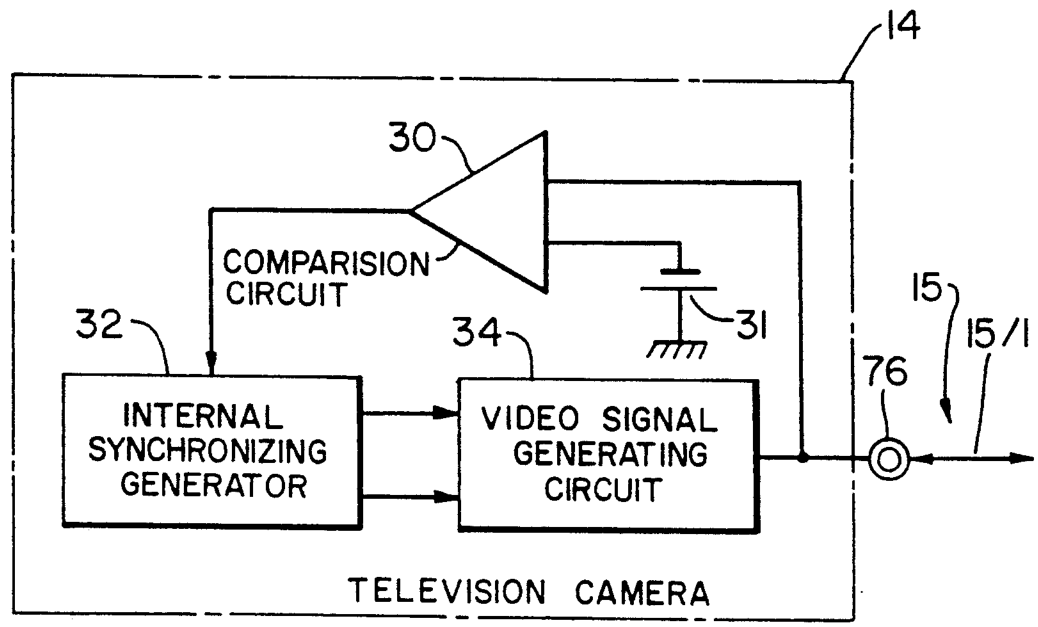
FIG. 2 is a block diagram showing an electric circuit of a television camera with a known frame of field externally synchronizing method.

As shown in FIG. 2, the television camera 14 is a well-known television camera synchronized by a synchronizing pulse having a level higher than the white level of a composite video signal, as described in U.S. Pat. No. 4,603,352, the contents of which are incorporated herein by reference.

The frequency of the external synchronizing signal commensurate with the frequency of the vertical scanning frequency of the video signal outputted from the transmitter 17. The frequency of the external synchronizing signal may be either of a frame scanning frequency or a field scanning frequency, for example, in case of NTSC system the vertical synchronizing signal frequency is 60 Hz, therefore, the field frequency is 60 Hz and the frame frequency is 30 Hz.

Accordingly, the television camera 14 comprises a comparison circuit 30 for comparing the voltage level of the vertical frame or field synchronizing pulse, fed from the external synchronizing signal generator 12 through the video transmission line 15 to a reference voltage, and generating a pulse signal when a frame or a field synchronizing pulse is equal or higher than the reference voltage, an internal synchronizing signal generator 32 for receiving the pulse signal outputted from the comparison circuit 30 and generating an internal synchronizing signal synchronized with the received pulse signal, and a video signal generating circuit 34 for generating a video signal.

One terminal of the comparison circuit 30 is connected to the video transmission line 15, and the other terminal of the comparison circuit 30 is connected to a reference voltage source 31. The reference voltage of the reference voltage source 31 has a level higher than the white level of the composite video signal, preferably a level approximately equal with the frame or field synchronizing pulse level.

The internal synchronizing signal generator 32 generates horizontal and vertical synchronizing signals on the basis of the pulse signal outputted from the comparison circuit 30. The composite video signal corresponding to the observed image is outputted from the video signal generating circuit 34 and is fed to the identification code generator 16 through the video transmission line 15.

As shown if FIG. 1 the synchronizing pulse adding circuit 22 injects the frame or field external synchronization pulses into the video transmission lines junctions 15/2, connecting the identification code generator 16 to the inputs of the switcher 20, however, depending on the method and the locations of where the identification code signals are injected into the video transmission lines, synchronizing pulse adding circuit 22 may be connected to another junctions along the video transmission lines for injecting the frame or field external synchronizing pulses.

If the identification code generators are placed at the side of the switch circuit 20 then the adder 22 will be connected for injecting the frame or field external synchronizing pulses into the video transmission lines junction 15/1, thereby, effectively feeding the frame or field external synchronizing pulses directly to the input terminal of the comparison circuit 30.

Figure 3:
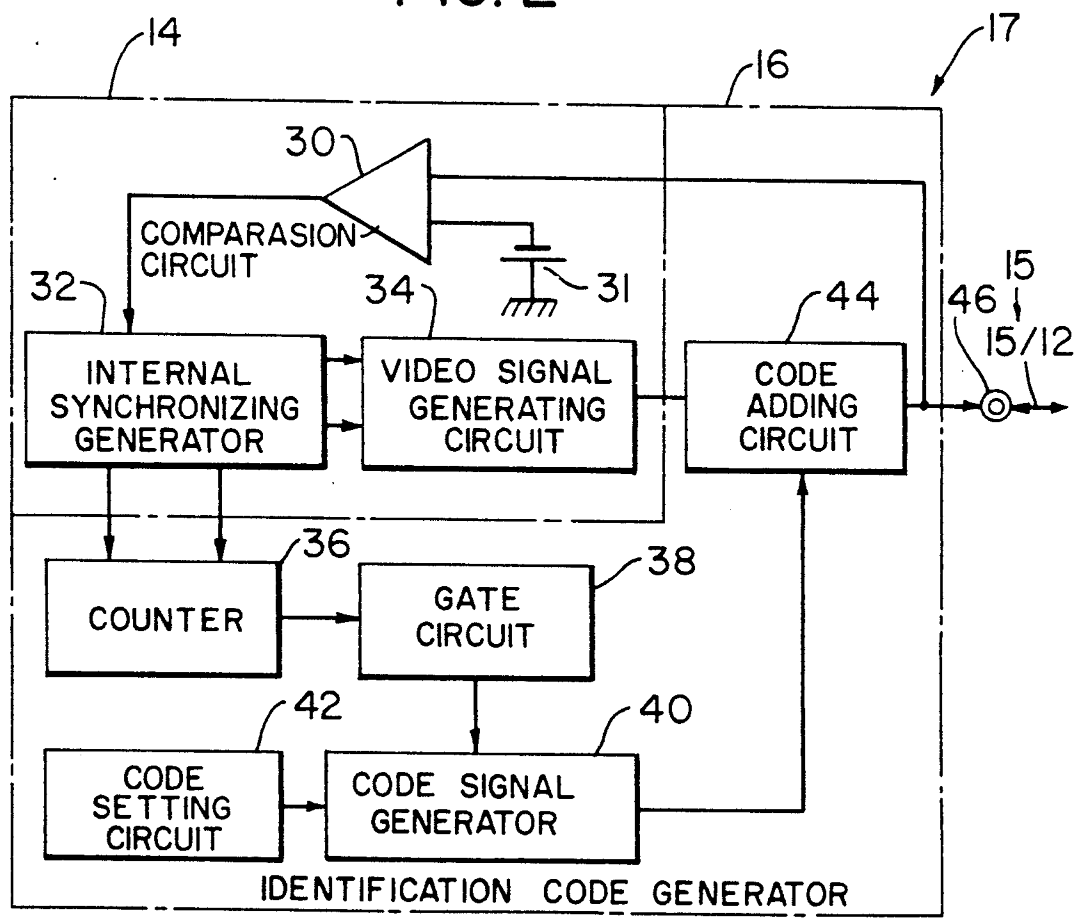
FIG. 3 is a block diagram showing an electric circuit of a television camera with identification code generator of a preferred embodiment of the present invention.

If the identification code generators 16 are placed inside the transmitter 17, than the terminal of the comparison circuit 30 shown in FIG. 2 to be connected to the video transmission line 15, junction 15/1 through terminal 76, will be connected, as shown in FIG. 3, to the video transmission line 15, junction 15/2 through terminal 46, thereby, the external frame or field synchronizing pulses are directly fed to the input terminal of the comparison circuit 30.

Figure 4:
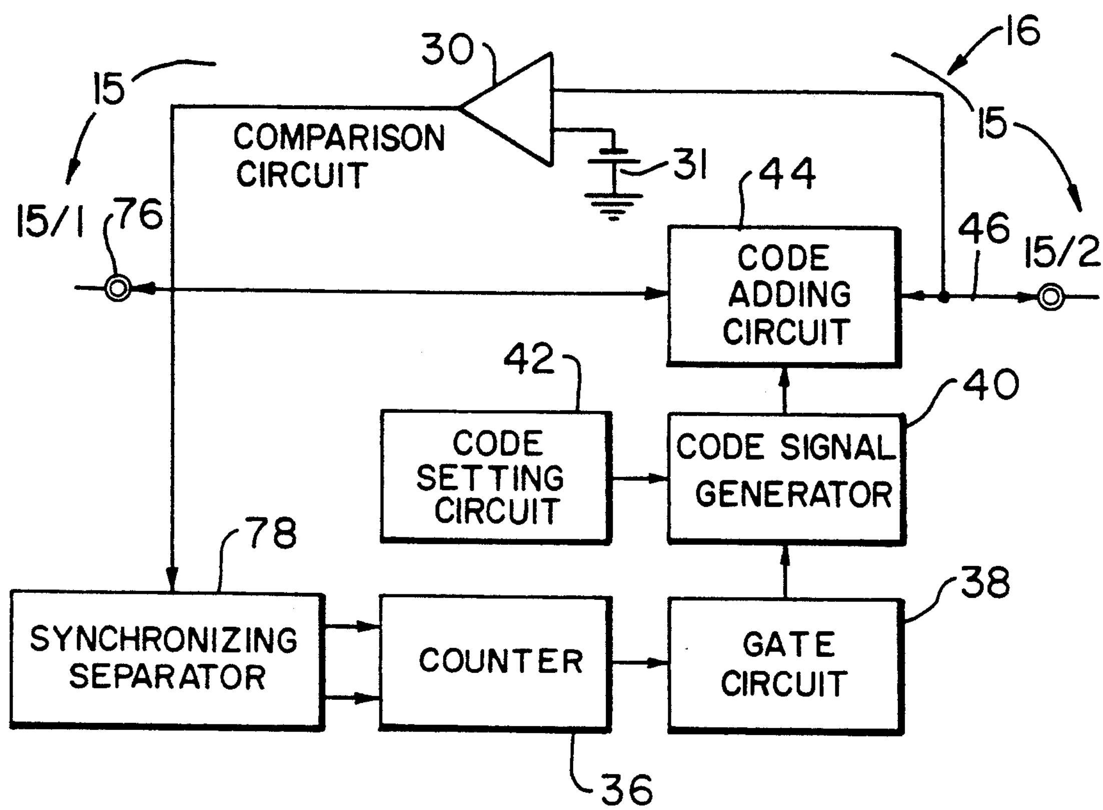
FIG. 4 is a block diagram showing another embodiment of the identification code generator circuit of the present invention.

As shown in FIG. 4, if the identification code generators 16 are disposed along the video transmission line 15, a comparison circuit 30 to transfer the external synchronization pulses from the switcher terminal side 46 to the transmitter terminal side 76 is placed across the identification code generator 16.

One input terminal of the comparison circuit 30 is used for comparing the voltage level of the frame synchronizing pulse received from the external synchronizing signal generator 12 through the video transmission line 15/2 and terminal 46 to a reference voltage, and regenerating a pulse signal on the basis of the received frame synchronizing pulse, when the frame synchronizing pulse is equal or higher than the reference voltage. The other input terminal of the comparison circuit 30 is connected to a reference voltage source 31, the reference voltage of the reference voltage source 31 has a level higher than the white level of the composite video signal, preferably a level approximately equal with the frame synchronizing pulse level.

The output terminal of the comparison circuit 30 is connected to video transmission line 15/1 through terminal 76 for outputting, the regenerated pulse on the basis of the received frame synchronizing pulse to the transmitter terminal 76 side. Thereby, the comparison circuit 30 is effectively a by-pass or transfer circuit for transferring the frame synchronizing pulse across the identification code generator 16 to the transmitter 17, when the identification code generator is disposed along the video transmission line 15.

Since the internal synchronization generator 32 is synchronized with the injected external frame of field synchronizing pulse, the frame synchronizing pulse presence in the video transmission line 15 is within the period corresponding to the vertical blanking interval in the composite video signal. In this step, the external frame or field synchronizing pulse is transmitted by the use of the transmission line for the video signal without affecting the video signal transmitted from the television camera.

However, to avoid signal level input error it is preferable to remove signal levels that are larger than the white level of the video composite signal from the composite video signal reaching the inputs of the receiver 18, the video recorder and playback 92, and the memory circuit 58.

Figure 5:
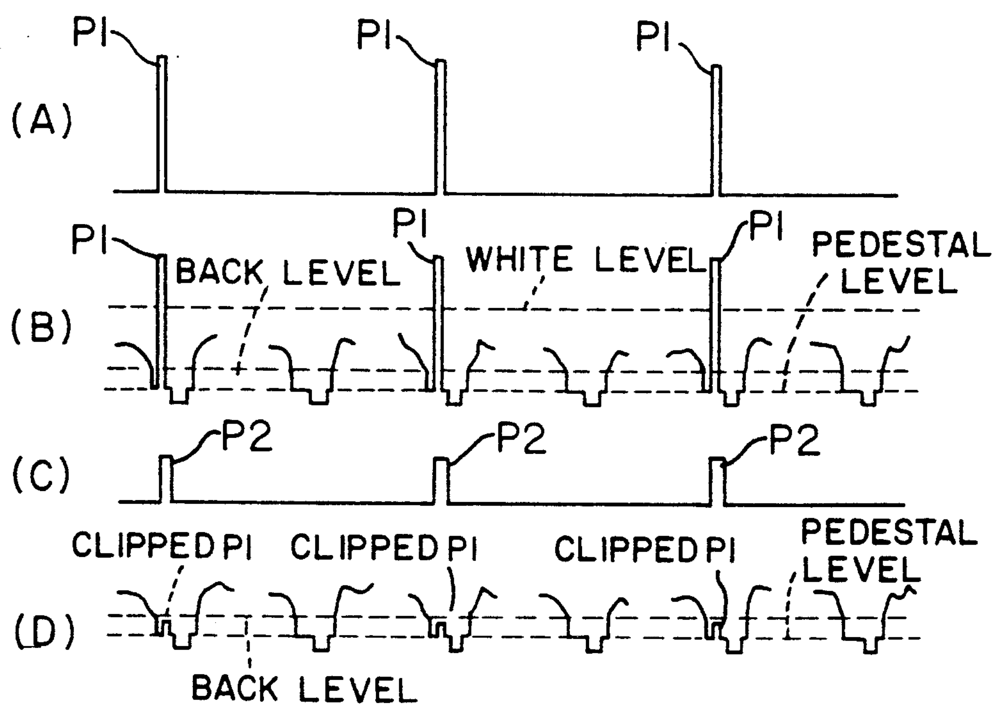
FIG. 5 is a diagram showing an electric signal waveform.

The external synchronizing generator 12 shown in FIG. comprises a synchronizing pulse shaping and timing circuit 21 for forming and generating two pulse signals P1 and P2 corresponding to a predetermined rate, width and level, as shown in FIGS. 5(A) and 5(C), a synchronizing pulse adding circuit 22, and synchronizing pulse clipping circuit 24.

The phase of the pulse signals P1 and P2 are corresponding to the vertical blanking interval of the composite video signal, as shown in FIG. 5(B), and at the same time the pulse signals P1 and P2 are shown having a frame rate, i.e. generated every second vertical field synchronizing signals. Further, the frame synchronizing pulse signal P1 has a level higher than the white level of the composite video signal, as shown in FIG. 5(B).

The input of the synchronizing pulse adding circuit 22 is fed with pulse P1, outputted from the output terminal of the synchronizing pulse shaping and timing circuit 21, and the output terminals of the synchronizing pulse adding circuit 22 are connected to the input terminals of the switch circuit 20, for receiving the composite video signal fed from the transmitters 17 through the video transmission line 15, and for injecting the frame synchronizing pulse P1 into the video transmission line. Therefore, the composite video signal fed to the switcher 20 results in a signal shown in FIG. 5(B), into which the pulse signal P1 is injected within the period corresponding to the vertical blanking interval.

The synchronizing pulse P1 is also inputed to the sequential switcher 20 for synchronizing the sequencing operation on the basis of the frame or field synchronizing pulses.

The input of the synchronizing pulse clipping circuit 24 is fed with pulse P2 outputted from the synchronizing pulse shaping and timing circuit 21 for clipping the signal of a portion, which corresponds to the pulse signal P1 in the composite video signal outputted from the output terminal of the switch circuit 20 and fed to the input of the synchronizing pulse clipping circuit 24, to below the black level of the composite video signal as shown in FIG. 5(D). Therefore, the pulse P1 is removed from the video signal fed to the receiver 18 through the synchronizing pulse clipping circuit 24, and will not influence the receiver 18, the video recorder and playback 92, and the memory circuit 58.

Therefore, even if any pulse signal P1 is included in the video signal fed to the synchronizing pulse clipping circuit 24, the pulse signal P1 is essentially removed by the synchronizing pulse clipping circuit 24, so that the video signal outputted from the synchronizing pulse clipping circuit 24 does not include any pulse signal P1.

The synchronizing pulse adding circuit 22 may be an injection circuit, using well known technic of mixing signals by employing readily available ICs, or by employing discrete circuit using transistors, resistors and diodes. Thus, the signal of the input terminals of the switch circuit 20 results in a composite video signal fed to the television cameras 14 injected with the frame synchronizing pulse. Therefore, the composite video signal injected with the frame synchonizing pulse is fed to the comparison circuit 30 of the television camera 14.

Instead of using the synchronizing pulse adding circuit 22 and the synchronizing pulse clipping circuit 24, the frame synchronizing pulse signal P1 may be outputted directly to the comparison circuit 30 of the television camera 14.

In case the television camera 14 is not provided with the comparison circuit 30, the pulse signal P1 or P2 may be outputted to the internal synchronizing generator 32 of the television camera 14. In the latter case, the synchronizing pulse adding circuit 22 and the synchronizing pulse clipping circuit 24 are not needed.

In case the television camera 14 is synchronized by the horizontal and vertical synchronizing signal, or by a composite synchronizing signal, or the horizontal and vertical drive signals, a generation circuit for the horizontal and vertical synchronizing signals, or composite synchronizing signal, or the horizontal and vertical drive signals may be disposed, instead of the synchronizing pulse shaping and timing circuit 21. In this case, the synchronizing pulse adding circuit 22 and the synchronizing pulse clipping circuit 24 are not needed.

Figure 6:
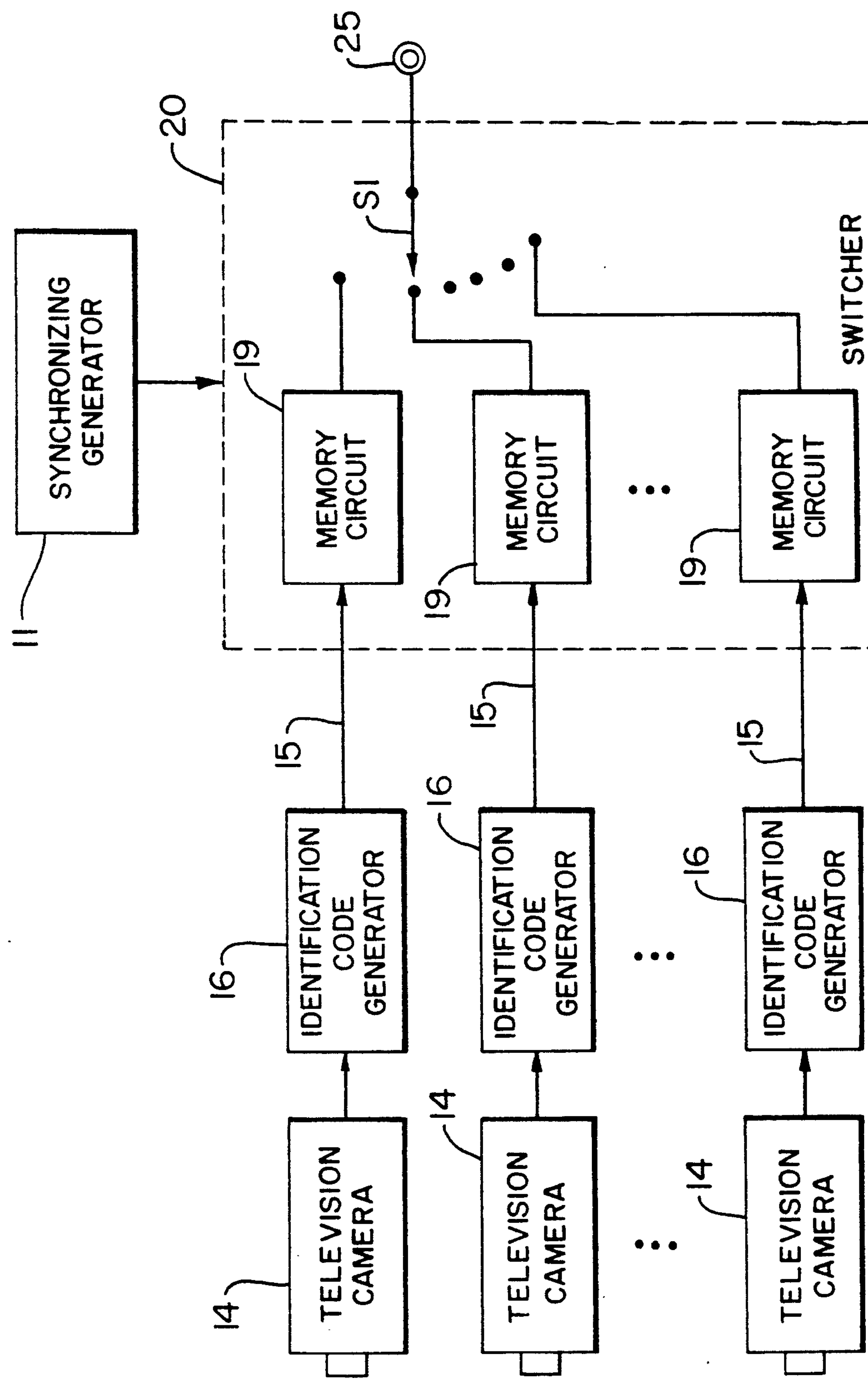
FIG. 6 is a block diagram showing another embodiment of an electric circuit of a synchronized switching method of the present invention.

Moreover, according to the present invention, non externally synchronized method and apparatus for coding, procession and retrieving signal is possible, by using for example, an individual frame or field memory circuit for each and every input of the switch circuit 20 as shown in FIG. 6, whereby, the frame or field memory circuit will store at least one vertical scanning period of the composite video signals generated by transmitters 17, and retrieve the stored composite video signal for outputting it to the switcher output terminal 25 in concert with the sequencing rate, on the basis of the synchronizing signal generated by the synchronizing generator thereby, providing smooth switching from one television camera to another. The memory circuit 19 will re-store fresh composite video signal transmitted from transmitters 17, with every sequencing cycle, and immediately after the stored composite video signal was outputted to the switcher output terminal 25.

It should be noted that the parts of the television camera and the synchronizing signal generator which are known have not been described in detail herein because they are disclosed in the referenced patents.

As shown in FIGS. 3 and 4, the identification code generator 16 incorporates counter 36 for counting the number of the horizontal scanning lines. The adder input of counter 36 receives the horizontal synchronizing signal, generated by the internal synchronizing signal generator 32, and the clear or reset input of the counter 36 receives the vertical synchronizing signal generated by the internal synchronizing signal generator 32, thereby, the counter 36 counts the number of the horizontal scanning lines every field or frame of the vertical scanning period of the television camera 14. The output of counter 36 is fed to the gate circuit 38.

The identification code generator 16 shown in FIG. 4 incorporates a synchronizing separator 78 for separating the internal synchronizing signal generated by the television camera 14 and transmitted through the video transmission line 15, and outputing the horizontal synchronizing pulses and the vertical synchronizing pulses to the counter 36, therefore, the identification code generator 16, shown in FIG. 4 can be placed along the video transmission line, remotely from the television camera 14.

The gate circuit 38 outputs a gate signal to the code signal generator 40 only when the count number in the counter 36 remains at a predetermined value, for a duration of at least one horizontal scanning line period. It is preferable that the predetermined value of the counter number is within the vertical blanking period, for example, in the NTSC system the first 21 horizontal scanning lines are within the vertical blanking period, therefore, it is preferable that the gate signal, generated by the gate circuit 38 is outputted for any predetermined number of horizontal scanning lines within, for example, the 8th to the 20th horizontal scanning lines of one vertical scanning period.

The code signal generator 40 is connected to a code setting circuit 42 for setting the camera identification code, therefore, the code generator 40 outputs a code signal corresponding to the identification code, set in the code setting circuit 42, to a code adding circuit 44 when the gate signal is received and for the duration of the gate signal.

The identification code set in the code setting circuit 42 is individually allotted code to each of the transmitters 17, to identify the composite video signal generated by the corresponding transmitter 14. Identification code such as numbers, "1", "2", "3" . . . "n", can be used as camera identification code, respectively.

The code signal is a binary code or a bar code signal having two or more levels, composed of a high level or white, which is the maximum level of the picture signal in the video signals, a low level or black, which is lowest level of the picture signal, and a median level or gray, which is the mid level of the picture signal in the video signal, generated by the television cameras 14.

Alternatively, the code signal may be either a sine-wave signal or a pulse signal having a frequency corresponding to the identification code, and the sine-wave or the pulse signal is generated during one or more horizontal scanning period, preferably, during the vertical blanking period.

The code adding circuit 44 superposes the code signal supplied from the code signal generator 40, into the video signal supplied from the corresponding television camera 14, and then outputs a composite signal composed of the code signal superposed in the video composite signal, to the video transmission line 15, through the terminal 46, to be connected to the input of the switch circuit 20.

The switch S1 of the switch circuit 20 connects in sequence and in synchronized rotation the transmitters 17 to the receiver 18 through the synchronizing pulse clipping circuit 24, on the basis of the external synchronizing signal generated by the external synchronizing signal generator 12, therefore, the transmitters 17 are connected in sequence and in rotation to the receiver 18 for at least one vertical scanning period of the composite video signal.

The switch S1, may be an electronic switching circuit using well known switching technic by employing readily available ICs, or by employing discrete circuit using transistors, resistors and diodes. The switching timing can be controlled by separating the synchronizing signals from the composite video signals by well known sync separators and controlling the switching timing on the basis of separated synchronizing pulses, or controlling the switching timing by the field or frame pulse generated by the external synchronizing generator 12.

The receiver 18 comprises a composite video signal amplifiers for inputing and outputing the composite video signal generated by the transmitters 17 into the video recorder 28, or inputing and outputing the composite video signal generated by the playback of the video recorder 28. The receiver 18 can be placed inside the switch circuit 20, or it can be a part of the video recorder 28.

The video recorder 28 can be any known available video recording apparatus, such as video tape recorder, or video cassette recorder, or an optical disc recorder, and/or other known available video recording and playing back apparatuses.

If the video recorder 28 uses a well known video cassette recorder for recording at a lapsed time base, the switch circuit 20 can be inputed with a predetermined sequencing time and rate commensurate with the time and the rate used for the controlling of the recording by the well known time lapse video cassette recorder.

As shown in FIG. 1, the video recorder 28 records the sequentially outputted composite video signals for a period of at least one field or frame of the composite video signals, comprising the composite video signals superposed with the identification code signal generated by the transmitters 17, continuously one after another and in rotation.

The played back composite video signal generated by the video recorder 28 is outputted to the memory circuit 58 and to the control circuit 52 through the receiver 18 and through the switch S2 of the switch circuit 20.

Figures 7, 8:
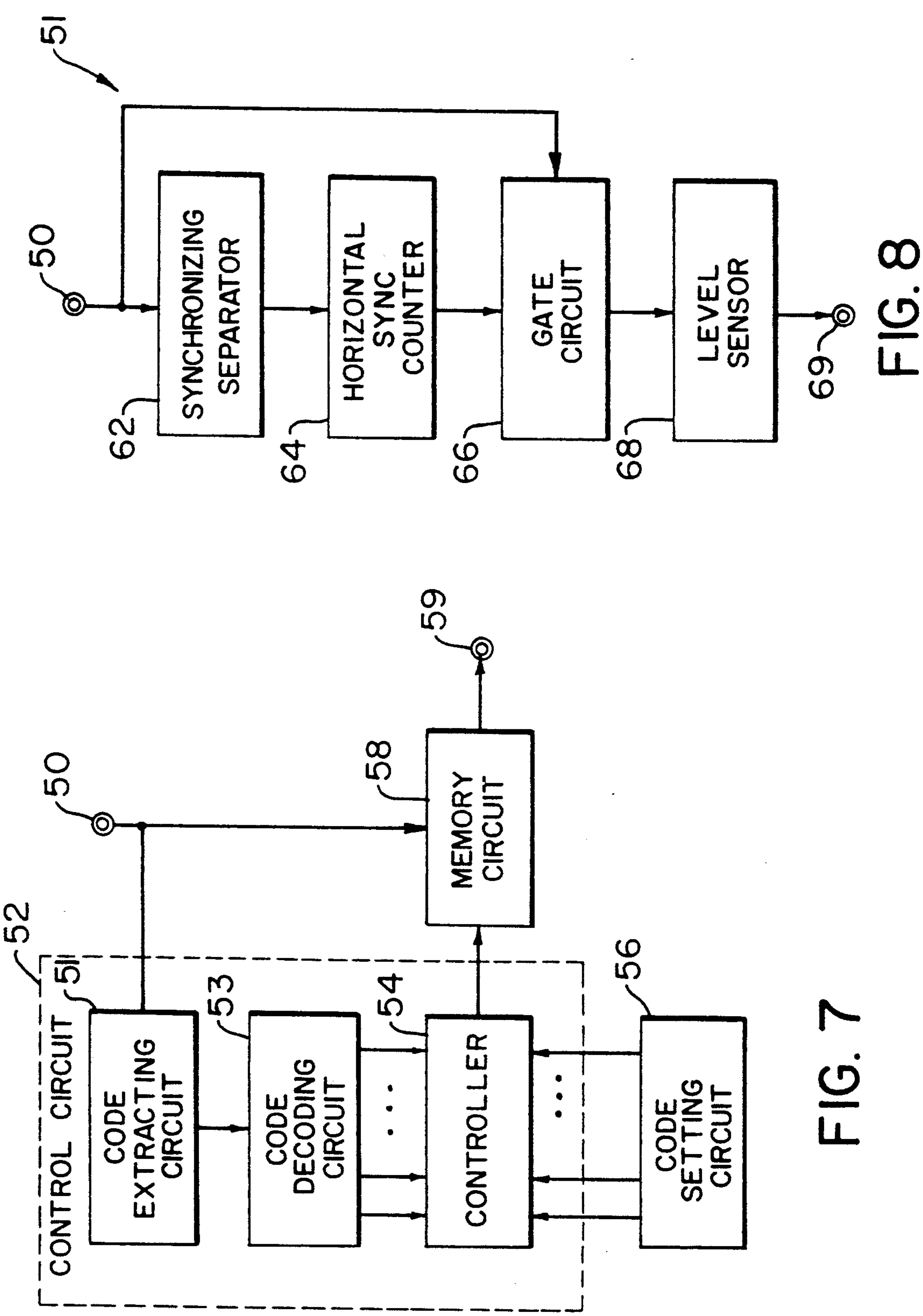
FIG. 7 is a block diagram showing the selective code processing circuit as a preferred embodiment of the present invention.
FIG. 8 is a block diagram showing a further embodiment of the code extracting circuit of the present invention.

In the preferred embodiment of the selective code processing shown in FIG. 7, the code extracting circuit 51 of the control circuit 52 receives the played back composite signal from the video recorder 28 through the terminal 50, and extracts the superposed identification code signal from the composite video signal. The extracted identification code signal is fed to the code decoding circuit 53, and the decoded identification code outputted from the code decoding circuit 53 is than fed to the controller 54. The controller 54 is also fed with a code set by the code setting circuit 56, commensurate with the identification code allotted to a transmitter 17.

Therefore, the controller 54 generates a coincidence signal when the decoded identification code fed from the code decoding circuit 53 corresponds to the code fed by the code setting circuit 56.

The coincidence signal generated by the controller is fed to the memory circuit 58 for opening the memory input, for renewing the storing of a video signal of at least one vertical scanning period of the composite video signal, fed to the memory circuit 58 through terminal 50.

Therefore, the coincidence signal generated by the controller 54 will start a renewed storing by the memory circuit 58 of at least one field or frame of the video signal which is superposed with an identification code that corresponds to the selected code, set by the code setting circuit 56.

Since the stored video signal in the memory circuit 58 is renewed only when the coincidence signal is generated by the controller 54, the video signal generated by the memory circuit 58 for outputting to the monitor 80, shown in FIG. 1, remain same until another coincidence signal is generated by the controller 54, and the memory storage is renewed by freshly inputed video signal.

Therefore, the image appearing on the monitor 80 remain same for a period of one sequencing rotation time, and until the composite video signal superposed with the same identification code signal is played back by the video recorder 28, at which time, a renewed image will appear on the monitor 80.

By selecting another code commensurate with a code allotted to a transmitter 17, through the code selecting circuit 56, it is possible to selectively retrieve any of the composite video signals generated by transmitters 17, recorded and regenerated by the video recorder 28, for display of selective image on the monitor 80.

The control circuit 52 decodes the identification code by utilizing the synchronizing signal of the composite video signal generated by transmitters 17, by extracting, sensing and reading the code signal high, low and median levels.

The extracting circuit 51, as shown in FIG. 8 may comprise, for example, a synchronizing separator 62 for separating and outputing the vertical and horizontal synchronizing pulses from the composite signal transmitted from the video recorder 28 and fed to terminal 50, a counter 64 for counting the number of horizontal scanning lines of the separated horizontal synchronizing pulses during every field or frame of the composite video signal, a gate circuit 66 for outputting the composite video signal fed from terminal 50, when the counted value of the counter 64 is a predetermined value, a level sensor 68 for sensing a level of the signal outputted from the gate circuit 66 to reproduce the code signal, and outputing the extracted code signal to terminal 69.

As shown in FIG. 1, the composite video signal is fed to the control circuit 52 and the memory circuit 58 via switch S2 of the switcher 20, therefore, by using the switch S2 it is possible to selectively retrieve individually selected composite video signals being inputted to the video recorder 28, therefore, it is possible to selectively retrieve any of the sequencing composite video signals generated by transmitters 17 and which are being recorded, for simultaneous displaying on the monitor 80 by using the same selective code processing. It is also possible to use the selective retrieving method only for displaying of an images on the monitor 80, without using the video recorder 28.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method for retrieving an individually selected composite video signal from sequentially connected plurality of composite video signals, generated by a plurality of transmitting means in a close circuit television system in combination with a receiver and a transmission line for transmitting the composite video signals from respective transmitting means to the receiver, said method comprising the steps of:

receiving a plurality of composite video signals from means for generating said composite video signals, each of said plurality of composite video signals being superposed with an individually allotted identification code;

connecting at least one vertical scanning period of each of the plurality of said composite video signals in sequence synchronized on the basis of a vertical scanning: and retrieving selectively an individually selected composite video signal by setting a selection code, and by extracting said identification code from said plurality of video signals connected in sequence and outputting said individually selected composite video signal when said extracted identification code and said selection code coincide, wherein said plurality of transmitting means are synchronized; and wherein the method further comprises the steps of:

transmitting a pulse signal having a voltage level higher than a maximum voltage level of said composite video signals or lower than a minimum voltage level of said composite video signals to respective transmitting means over the transmission line used for receiving the composite video signal as an external synchronizing signal by using blanking level portions of the composite video signals;

separating said pulse signal transmitted over the transmission line from said composite video signals by comparing said composite video signals to a reference signal having a voltage level approximately equal to the voltage level of the pulse signal; and applying said separated pulse signal to respective transmitting means.

2. A method as set forth in claim 1, wherein said outputted individually selected composite video signal is routinely stored in means for storing video signals and regenerated for displaying an image on the basis of said individually selected composite video signal.

3. A method as set forth in claim 1, wherein said pulse signal is opposite in polarity to an internal synchronizing signal which is contained in each of said composite video signals.

4. A method for recording a plurality of composite video signals from sequentially connected plurality of composite video signals, generated by a plurality of transmitting means in a closed circuit television system in combination with a video recorder and a transmission line for transmitting the composite video signals from respective transmitting means to the video recorder, and retrieving individually selected composite video signal from a regenerated played back signal, said method comprising the steps of:

receiving a plurality of composite video signals from means for generating said composite video signals, each of said plurality of composite video signals superposed with an individually allotted identification code;

recording at least one vertical scanning period of each of the plurality of said composite video signals in sequence synchronized on the basis of a vertical scanning;

regenerating said plurality of composite video signals in sequence from means for regenerating recorded composite video signals; and retrieving selectively an individually selected composite video signal by setting a selection code, and by extracting said identification code from the regenerated plurality of video signals and outputting said individually selected composite video signal when said extracted identification code and said selection code coincide, wherein said plurality of transmitting means are synchronized, and wherein the method further comprises the steps of:

transmitting a pulse signal having a voltage level higher than a maximum voltage level of said composite video signals or lower than a minimum voltage level of said composite video signals to respective transmitting means over the transmission line used for receiving the composite video signal as an external synchronizing signal by using blanking level portions of the composite video signals;

separating said pulse signal transmitted over the transmission line from said composite video signal by comparing said composite video signals to a reference signal having a voltage level approximately equal to the voltage level of the pulse signal; and applying said separated pulse signal to respective transmitting means.

5. A method as set forth in claim 4, wherein the outputted individually selected composite video signal is routinely stored and regenerated for displaying an image on the basis of said individually selected composite video signal.

6. A method as set forth in claim 4, wherein said pulse signal is opposite in polarity to an internal synchronizing signal which is contained in each of said composite video signals.

7. A closed circuit television apparatus comprising:

a plurality of transmitting means for generating composite video signals;

a receiving means for receiving said composite video signals;

a switching means for sequentially connecting said transmitting means to said receiving means;

a plurality of transmission lines for connecting said transmitting means to said switching means;

each of said transmitting means including a television camera to which an identification code is allotted, a circuit for generating code signals corresponding to said identification code, and a circuit for generating composite video signals wherein the code signals are superposed into the composite video signals;

receiving means including a circuit for receiving said composite video signals in sequence for extracting identification codes from the received composite video signals, and a selective outputting circuit for setting a selective code for outputting selectively composite video signal generated from said transmitting means when said selective code and said identification code coincide;

a device for synchronizing the plurality of said television cameras;

external synchronizing signal generator circuit means connected to respective transmission lines adjacent to the switching means, for generating a pulse signal having a voltage level higher than a maximum voltage level of said composite video signals generated by the respective transmitting means or lower than a minimum voltage level of said composite video signal; and comparator circuit means associated respectively with said television cameras for separating said pulse signal transmitted over the transmission lines from said composite video signals by comparing said composite video signals to a reference signal having a voltage level approximately equal to the voltage level of the pulse signal, and applying said separated pulse signal to said television cameras associated with said comparator circuit means, thereby synchronizing said television cameras to each other.

8. A closed circuit television apparatus according to claim 7, wherein said circuit for generating code signal is a circuit for generating said code signal during one or more desired horizontal scanning period of said television camera.

9. A closed circuit television apparatus according to claim 8, wherein said circuit for generating code signals includes a code setting circuit in which said identification code is set, a counter for counting a number of horizontal scanning lines of said television camera every field or frame of vertical scanning, and a circuit for generating when a counted value of the counter is a predetermined value said code signal corresponding to said identification code set in said code setting circuit.

10. A closed circuit television apparatus according to claim 7, wherein said circuit for generating code signals is disposed along a corresponding transmission line and includes a circuit for generating said code signals during one or more desired horizontal scanning period of said television camera, a synchronizing separating circuit for separating and outputting horizontal and vertical synchronizing pulses from said composite video signal, a code setting circuit in which said identification code is set, a counter for counting a number of horizontal scanning lines of said television camera every field or frame of vertical scanning, a circuit for generating said code signals corresponding to said identification code set in said code setting circuit when a counted value of the counter is a predetermined value; an a bypass passage means including a comparator circuit means connected to the respective transmission lines adjacent to said switching means for separating said pulse signal transmitted over the transmission lines from said composite video signals by comparing said composite video signals to a reference signal having a voltage level approximately equal to the voltage level of the pulse signal, and applying said separated pulse signal to the respective transmission line adjacent to said transmitting means for allowing said pulse signal to be transmitted toward said television camera on the basis of a signal voltage level.

11. A closed circuit television apparatus according to claim 8 wherein said code signal having at least two levels, high which is a white level and low which is a black level of a picture signal in composite video signal.

12. A closed circuit television apparatus according to claim 7, wherein said receiving means includes a video recording means for recording the received composite video signals in sequence.

13. A closed circuit television apparatus according to claim 12, wherein said video recording means includes a circuit to regenerate said recorded composite video signals, and a circuit to output the regenerated composite video signal in sequence for extracting said identification codes from the regenerated composite video signals, and for outputting selectively composite video signal regenerated from said video recording means when said selective code and said identification code coincide.

14. A closed circuit television apparatus according to claim 7, wherein said selective outputting circuit includes a memory circuit for storing at least one vertical scanning period of the selectively outputted composite video signal, and retrieving the composite video signal for regenerating on the basis of the retrieved composite video signal a display image on a television monitor.

15. A closed circuit television apparatus according to claim 12, wherein the video recording means includes a video recorder and playback means to record and playback signals at time lapse base, said apparatus further comprising a device for setting a predetermined selectable sequencing time and rate commensurate with the time and rate sued for the controlling of the video recorder and playback signal at time lapse base.

16. A closed circuit television apparatus comprising:

a plurality of transmitting means for generating composite video signals;

a receiving means for receiving said composite video signals;

a switching means for sequentially connecting said transmitting means to said receiving means;

a plurality of transmission lines for connecting said transmitting means to said switching means;

each of said transmitting means including a television camera to which an identification code is allotted, a circuit for generating code signals corresponding to said identification code, and a circuit for generating composite video signals wherein the code signals are superposed into the composite video signals;

receiving means including a circuit for receiving said composite video signals in sequence for extracting identification codes from the received composite video signals, and a selective outputting circuit for setting a selective code for transmitting means when said selective code and said identification code coincide;

a device for synchronizing the plurality of said television cameras; and external synchronizing signal generator circuit means connected to said transmitting means for generating external synchronizing signals composed of one of vertical synchronizing pulses, vertical synchronizing and horizontal pulses combining the vertical and horizontal synchronizing pulses, and synchronizing said television cameras to each other.

17. A closed circuit television apparatus according to claim 16, wherein said apparatus further comprises a device for synchronizing said switching means; and a circuit for connecting said external synchronizing signal generator circuit means to said switching means for synchronizing sequencing switching on the basis of said external synchronizing signal.

18. A closed circuit television apparatus according to claim 16, wherein said circuit for generating code signals is disposed along a corresponding transmission line and includes a circuit for generating said code signals during one or more desired horizontal scanning period of said television camera, a synchronizing separating circuit for separating and outputting horizontal and vertical synchronizing pulses from said composite video signal, a code setting circuit in which said identification code is set, a counter for counting a number of horizontal scanning lines of said television camera every field or frame of vertical scanning, and a circuit for generating said code signals corresponding to said identification code set in said code setting circuit when a counted value of the counter is a predetermined value.

19. A closed circuit television apparatus comprising:

a plurality of transmitting means for generating composite video signals;

a receiving means for receiving said composite video signals;

a switching means for sequentially connecting said transmitting means to said receiving means;

a plurality of transmission lines for connecting said transmitting means to said switching means;

each of said transmitting means including a television camera to which an identification code is allotted, a circuit for generating code signals corresponding to said identification code, and a circuit for generating composite video signals wherein the code signals are superposed into the composite video signals;

receiving means including a circuit for receiving said composite video signals in sequence for extracting identification codes from the received composite video signals, and a selective outputting circuit for setting a selective code for outputting selectively composite video signal generated from said transmitting means when said selective code and said identification code coincide;

a device for synchronizing the plurality of said television cameras; and external synchronizing signal generator circuit means connected to said transmitting means for generating external synchronizing signals composed of one of a vertical drive signal, and vertical drive and horizontal drive signals, and driving synchronically said television cameras.

20. A closed circuit television apparatus comprising:

a plurality of transmitting means for generating composite video signals;

a receiving means for receiving said composite video signals;

a switching means for sequentially connecting said transmitting means to said receiving means;

a plurality of transmission lines for connecting said transmitting means to said switching means;

each of said transmitting means including a television camera to which an identification code is allotted, a circuit for generating code signals corresponding to said identification code, and a circuit for generating composite video signal wherein the code signals are superposed into the composite video signals;

receiving means including a circuit for receiving said composite video signals in sequence for extracting identification codes from the received composite video signals, and a selective outputting circuit for setting a selective code for outputting selectively composite video signal generated from said transmitting means when said selective code and said identification code coincide;

a device for synchronizing said switching means;

a plurality of memory means disposed at respective inputs of said switching means for storing and retrieving at least one vertical scanning period of said composite video signal generated by said transmitting means;

external synchronizing signal generator circuit means connected to said switching means and said memory means, for generating a synchronizing signal commensurate with said vertical scanning of said composite video signals generated by the respective transmitting means; and means for applying said synchronizing signal to synchronize the retrieving stored composite video signal with a sequencing switching timing.

* * * * *